(12) United States Patent
LaMotte (10) Patent No.: US 9,832,303 B2
(45) Date of Patent: Nov. 28, 2017

(54) USER INTERFACE DEVICE

(71) Applicant: KEOLABS, Montbonnot Saint Martin (FR)

(72) Inventor: Francis LaMotte, Bernin (FR)

(73) Assignee: KEOLABS, Montbonnot Saint Martin (FR)

( * ) Notice: Subject to any disclaimer, the term of this patent is extended or adjusted under 35 U.S.C. 154(b) by 54 days.

(21) Appl. No.: 14/715,752

(22) Filed: May 19, 2015

(65) Prior Publication Data

US 2015/0334221 A1    Nov. 19, 2015

(30) Foreign Application Priority Data

May 19, 2014  (FR) ..................... 14 54445

(51) Int. Cl.

| | | |
|---|---|---|
| *H04W 76/02* | (2009.01) | |
| *H04M 1/725* | (2006.01) | |
| *H04W 12/06* | (2009.01) | |
| *H04W 12/08* | (2009.01) | |
| *H04W 4/00* | (2009.01) | |
| *G01R 31/00* | (2006.01) | |
| *G06F 11/36* | (2006.01) | |
| *G06F 13/00* | (2006.01) | |
| *G06F 11/22* | (2006.01) | |
| *G06F 21/00* | (2013.01) | |
| *G06F 21/44* | (2013.01) | |
| *G06F 21/85* | (2013.01) | |
| *G06F 9/44* | (2006.01) | |
| *G06F 9/445* | (2006.01) | |

(52) U.S. Cl.
CPC ........ *H04M 1/72533* (2013.01); *G01R 31/00* (2013.01); *G06F 11/22* (2013.01); *G06F 11/3656* (2013.01); *G06F 13/00* (2013.01); *G06F 21/00* (2013.01); *G06F 21/44* (2013.01); *G06F 21/85* (2013.01); *H04W 4/008* (2013.01); *H04W 12/06* (2013.01); *H04W 12/08* (2013.01); *H04W 76/023* (2013.01); *G06F 8/38* (2013.01); *G06F 8/61* (2013.01)

(58) Field of Classification Search
CPC ..... H04W 12/06; H04W 12/08; H04W 4/008; G06F 8/38; G06F 21/00
USPC .................. 455/410, 411, 420; 713/182, 189
See application file for complete search history.

(56) References Cited

U.S. PATENT DOCUMENTS

| | | |
|---|---|---|
| 2009/0027058 A1 | 1/2009 | Ishii |
| 2009/0249136 A1 | 10/2009 | Halstvedt et al. |
| 2010/0332213 A1 | 12/2010 | Okamiya |

OTHER PUBLICATIONS

French Search Report in French Patent Application No. 14/54445 issued on Jan. 15, 2015, 2 pages.

*Primary Examiner* — Sam Bhattacharya
(74) *Attorney, Agent, or Firm* — Moreno IP Law LLC (57) ABSTRACT

A communication device intended to be connected to a debugging port of a first microcontroller, the communication device including a second microcontroller connected to a first wireless communication unit and intended to be connected to said debugging port, the first wireless communication unit being capable of receiving a request over a wireless communication link transmitted by a user interface device, the second microcontroller being capable of authenticating the user interface device, of determining, in the case where the user interface device is authenticated, whether the request is authorized for said authenticated user interface device, and of transmitting the request to the debugging port only if the request is authorized.

16 Claims, 3 Drawing Sheets

Fig 7 and# USER INTERFACE DEVICE

BACKGROUND

The present disclosure relates to a user interface device for an electronic or electromechanical system comprising a microcontroller and a method of controlling such a system.

DISCUSSION OF THE RELATED ART

Many electronic or electromechanical systems comprise a microcontroller which controls the system elements. Examples of electronic or electromechanical systems are equipment such as air conditioning, elevators, automated doors, household appliances such as coffee machines or home automation devices.

It is generally desirable to equip such systems with a user interface device to enable a user to control the system operation and/or to view data supplied by the system. There exist many types of user interface devices. A simple user interface device may comprise buttons and/or potentiometers operable by the user. A more complex user interface device for example comprises a touch screen having a graphic interface displayed thereon.

However, the user interface device of such a system cannot provide access to all the functions capable of being carried out by the system. This may result from cost and/or bulk constraints on design of the system. This may also occur after the commercialization of the system, for example, when a need for a new function capable of being carried out by the system, but which cannot be controlled by the initially-provided user interface device, appears.

However, it may be impossible to consider disassembling an already-present user interface device to replace it with another one, particularly for cost and/or bulk reasons. Further, designing a new user interface device may be difficult since it may cause a hardware modification of the system microcontroller and/or a modification of the programs executed by the microcontroller.

SUMMARY

An object of an embodiment is to overcome all or part of the disadvantages of the previously-described user interface devices.

Another object of an embodiment is to enable the user interface device to exchange data with the microcontroller of the electronic or electromechanical system over a wireless link.

Another object of an embodiment is for the installation of the user interface device to cause no modifications of the programs executed by the microcontroller of the electronic or electromechanical system.

Another object of an embodiment is for the user interface device to correspond to an already-existing device, further carrying out other functions, particularly a smartphone, a touch pad, or a laptop computer.

Thus, an embodiment provides a communication device intended to be connected to a debugging port of a first microcontroller, the communication device comprising a second microcontroller connected to a first wireless communication unit and intended to be connected to said debugging port, the first wireless communication unit being capable of receiving a request over a wireless communication link transmitted by a user interface device, the second microcontroller being capable of authenticating the user interface device, of determining, in the case where the user interface device is authenticated, whether the request is authorized for said authenticated user interface device, and of transmitting the request to the debugging port only if the request is authorized.

According to an embodiment, the second microcontroller comprises a first memory having a list of identifiers stored into it and the second microcontroller is capable of authenticating the user interface device based on the comparison of an identifier received by the wireless communication unit with the list of identifiers.

According to an embodiment, the request comprises an operation of reading from or writing into a location of a second memory of the first microcontroller, the second microcontroller being capable of determining whether the request is authorized by determining whether the location belongs to a list of locations authorized for the authenticated user interface device and whether the request read or write operation is authorized for said location.

According to an embodiment, the first wireless communication unit is connected to a first antenna, the communication device comprising a second wireless communication unit connected to a second antenna different from the first antenna.

According to an embodiment, the first wireless communication unit is capable of implementing a NFC communication method and the second wireless communication unit is capable of implementing a Bluetooth communication method.

According to an embodiment, the communication device comprises a third wireless communication unit connected to a third antenna different from the first and second antennas.

According to an embodiment, the third wireless communication unit is capable of implementing a GSM communication method.

According to an embodiment, the second microcontroller is capable of authenticating the user interface device based on the comparison of a password received by the first wireless communication unit with a list of passwords.

An embodiment also provides an electronic or electromechanical system comprising:

a first microcontroller comprising a processor, a second memory, a debugging unit, and a debugging port, the debugging unit and the processor being capable of reading and of writing data from and into the second memory, the debugging unit being connected to the debugging port;

a communication device such as previously defined, connected to the debugging port; and a user interface device capable of transmitting a request to the communication device by a wireless communication.

According to an embodiment, the user interface device is selected from the group comprising a smartphone, a touch pad, or a laptop computer.

According to an embodiment, the debugging port is a SWD or JTAG port.

An embodiment also provides a method of controlling an electronic or electromechanical system such as previously defined, comprising the steps of:

authentication of the user interface device by the second microcontroller;

transmission by the user interface device of a request to the communication device over a wireless link;

analysis of the request by the second microcontroller in the case where the user interface device is authenticated, to determine whether the request is authorized for said authenticated user interface device; and transmission by the second microcontroller of the request to the debugging unit via the debugging port only if the request is authorized.

According to an embodiment, the second microcontroller comprises a first memory having a list of identifiers stored into it and the second microcontroller authenticates the user interface device based on the comparison of an identifier received by the wireless communication unit with the list of identifiers.

According to an embodiment, the method further comprises the steps of:

reading or writing of data from or into the second memory by the debugging unit based on the request;

supply of the data to the communication device by the debugging unit via the debugging port; and supply of the data by the communication device to the user interface device over a wireless link.

The foregoing and other features and advantages will be discussed in detail in the following non-limiting description of specific embodiments in connection with the accompanying drawings.

DETAILED DESCRIPTION

For clarity, the same elements have been designated with the same reference numerals in the various drawings and, further, as usual in the representation of integrated circuits, the various drawings are not to scale. In the following description, expressions "substantially", "around", and "approximately" mean "to within 10%". Further, only those elements which are necessary to the understanding of the present invention will be described and shown in the drawings. In particular, the microcontroller power supply means are well known by those skilled in the art and are not described in detail. Further, a signal which alternates between a first constant state, for example, a low state, noted "0", and a second constant state, for example, a high state, noted "1", is called "binary signal". The high and low states of different binary signals of a same electronic circuit may be different. In particular, the binary signals may correspond to voltages or to currents which may not be perfectly constant in the high or low state.

Figure 1:
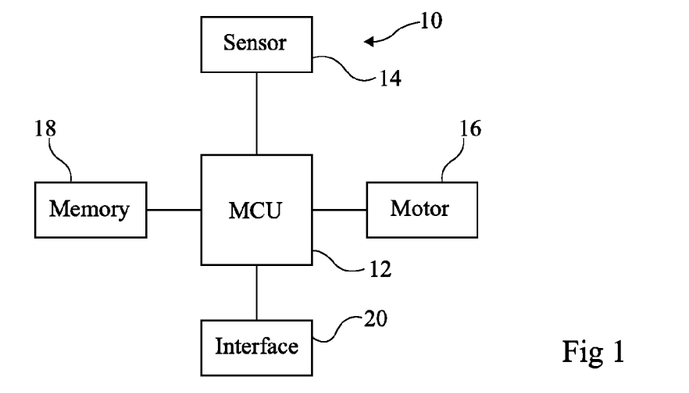
FIG. 1 partially and schematically shows an example of an electromechanical system controlled by a microcontroller.

FIG. 1 partially and schematically shows an example of an electromechanical system 10. System 10 comprises a microcontroller 12 (MCU) which, for example, is connected to a sensor 14 (Sensor), an actuator 16 (Motor), possibly an external memory 18 (Memory), and possibly a user interface device 20 (Interface). Microcontroller 12 is an integrated circuit which gathers the essential elements of a computer: a processor, memories, peripheral units, and input-output interfaces. Microcontroller 12 may be connected to more than one sensor 14 or more than one actuator 16. As an example, when system 10 corresponds to a coffee machine, the sensors may correspond to a sensor of the temperature of the water used to make the coffee, a sensor of the pressure of water injection into the coffee, a water level sensor, a coffee bean level sensor, etc. Actuator 16 may correspond to a pump used to circulate water. User interface device 20 may comprise one or a plurality of buttons for selecting the characteristics of the desired drink. Microcontroller 12 may execute instructions of programs stored in a memory integrated to microcontroller 12 or stored in memory 18 to carry out different functions. A user may control microcontroller 12 by means of user interface device 20 to carry out these functions. As an example, the execution of a program by microcontroller 12 may cause the controlling of actuator 16 according to the data supplied by sensor 14.

Figure 2:
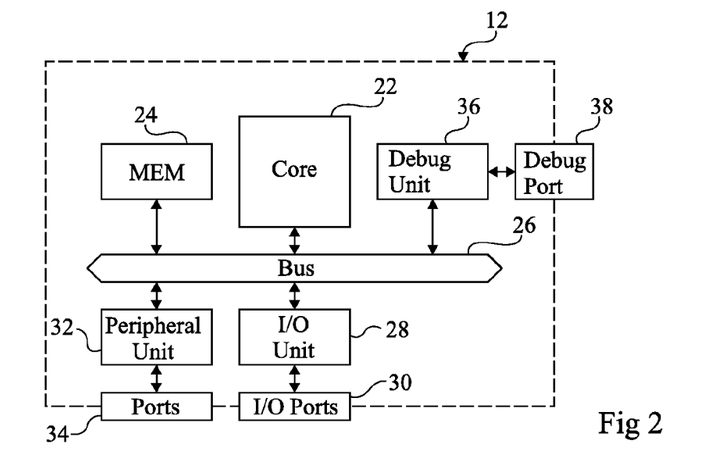
FIG. 2 partially and schematically shows an example of a microcontroller.

FIG. 2 very schematically shows an example of a microcontroller 12 having an architecture of Cortex-M type such as specified by company ARM. Microcontroller 12 comprises a microcontroller core or processor 22 (Core) capable of reading data from or of writing data into at least one memory 24 (MEM) via a data exchange bus 26 (Bus). Microcontroller 12 may comprise an input/output control unit 28 (I/O Unit) connected to bus 26 and to access ports 30 (I/O Ports). Access port here means a set of input and/or output terminals, or pins, capable of receiving signals from the outside to the inside of microcontroller 12 and/or from the inside to the outside of microcontroller 12. Access ports 30 are connected to the different components of system 10 necessary for system 10 to operate, particularly sensor 14, actuator 16, memory 18, and user interface device 20. Microcontroller 12 may further comprise additional peripherals 32 (Peripheral Unit) connected to bus 26 and to access ports 34 (Ports).

Microcontroller 12 further comprises a debugging unit 36 (Debug Unit) capable of exchanging data with processor 22 and memory 24 via data exchange bus 26. Microcontroller 12 further comprises a debugging port 38 (Debug Port) connected to debugging unit 36. During a maintenance operation, a debugging system, external to microcontroller 12, may be connected to debugging port 38 to carry out a test or debugging operation. As an example, a test or debugging operation may comprise the transmission of requests to debugging unit 36 to read or write data stored in memory 24. Debugging unit 36 and debugging port 38 may be adapted to implement a test or debugging protocol of SWD (Serial Wire Debug) or JTAG (Join Test Action Group) type.

User interface device 20 may appear not to be adapted to control microcontroller 12 to carry out certain functions or to display certain data. This may occur when, for cost or bulk reasons, the user interface device 20 used has a simple structure. As an example, user interface device 20 may comprise a few buttons only, which enable to select but a small number of commands. Further, user interface device 20 may only comprise light-emitting diodes which enable to view but little information, or rather unclearly. This may further occur when it is desirable to be able to control microcontroller 12 to carry out new functions. User interface device 20 may then not enable to control the carrying out of such new functions while they could be carried out by microcontroller 12 by a simple change of the programs executed by microcontroller 12.

A possibility would be to replace user interface device 20 with another user interface device capable of implementing the desired functions, for example comprising a touch screen. This however requires modifying the structure of electromechanical system 10 to receive this new user interface device. This further requires adapting the programs executed by processor 22 to take into account data exchanges with the new user interface device. Thereby, such a user interface device, which should be installed on each electromechanical system 10, has a high cost.

To avoid modifying user interface device 20, a possibility would be to connect a new user interface device to microcontroller 12 by a wireless link, for example, a near-field communication link or NFC link, or a short-distance radio connection, for example, according to the Bluetooth specification.

Figure 3:
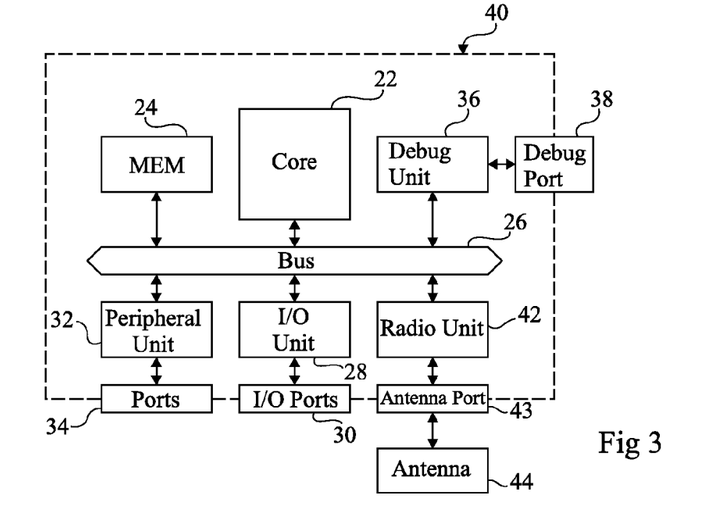
FIG. 3 partially and schematically shows an example of a microcontroller adapted to the installing of a wireless user interface device.

FIG. 3 partially and schematically shows an example of a microcontroller 40 capable of being connected to a user interface device by a wireless link. Microcontroller 40 comprises all the elements of microcontroller 12 shown in FIG. 2 and further comprises a wireless communication unit 42 (Radio Unit) connected, by an antenna port 43 (Antenna Port), to a signal transmit and receive antenna 44 (Antenna). A user interface device, not shown, may exchange data with microcontroller 40 by a wireless communication method. A disadvantage of the structure shown in FIG. 3 is that it requires both modifying the structure of microcontroller 12 shown in FIG. 2 and modifying the programs executed by processor 22. According to a variation, wireless communication unit 42 (Radio Unit), instead of being integrated to microcontroller 40, may be connected to access ports 30. However, even if this then causes no modifications of the structure of microcontroller 12, the programs executed by processor 22 have to be adapted to take into account additional messages which are exchanged with the wireless control unit by access ports 30.

It would be desirable to be able to connect a user interface device to microcontroller 12 by a wireless link without modifying either the structure of microcontroller 12 or the programs executed by processor 22 of microcontroller 12.

Figure 4:
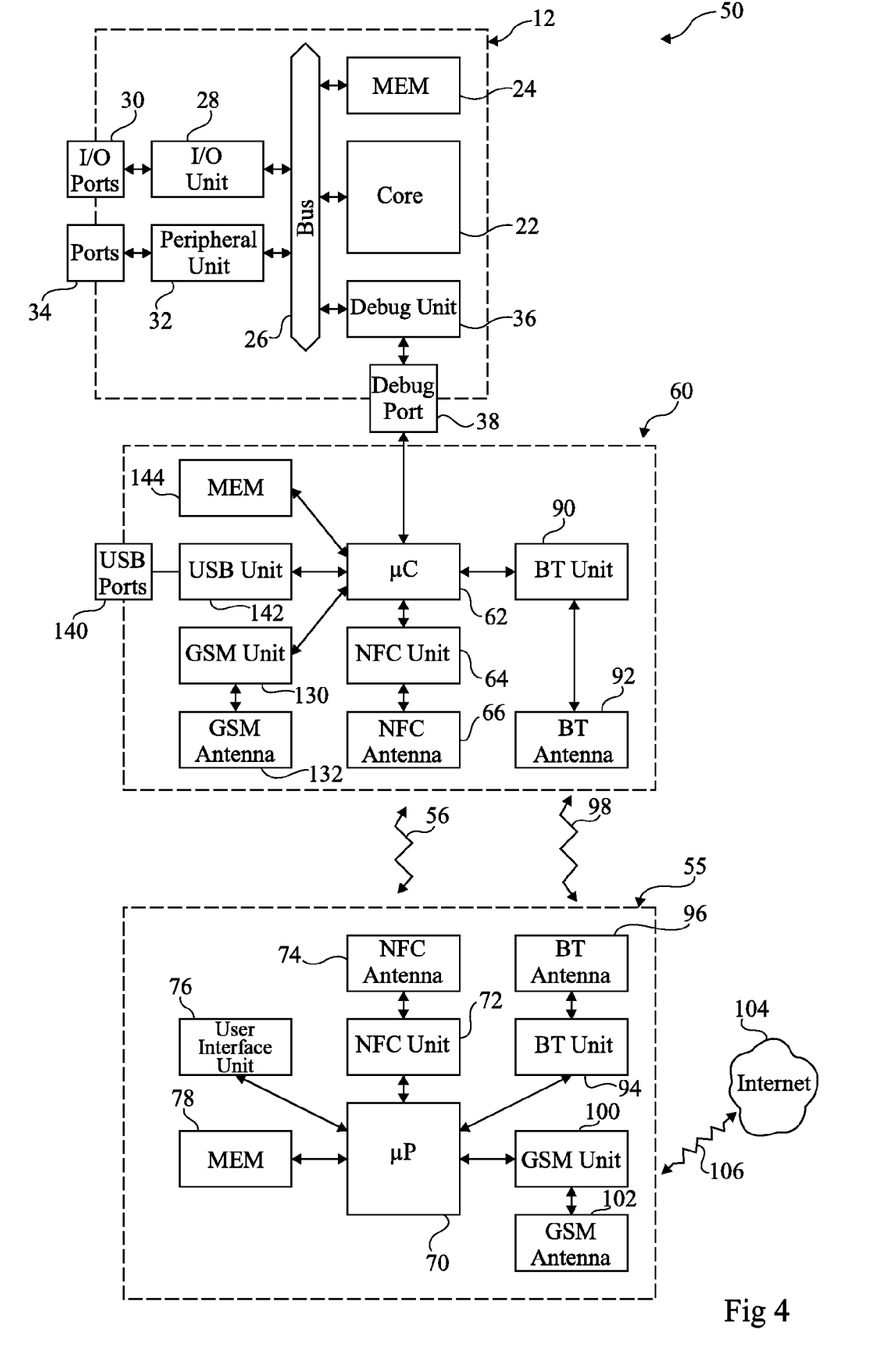
FIG. 4 partially and schematically shows an embodiment of an electromechanical system comprising a wireless user interface device.

FIG. 4 shows an embodiment of an electronic or electromechanical system 50 capable of being controlled by at least one user interface device 55 over a wireless link 56. System 50 comprises microcontroller 12 of FIG. 2 and may further comprise the other elements, not shown, of electromechanical system 10 of FIG. 1. System 50 further comprises a secure wireless communication device 60, connected to debugging port 38 of microcontroller 12. According to an embodiment, communication device 60 may be soldered to the board having microcontroller 12 affixed thereon. As a variation, device 60 may be connected to debugging ports 38 by a cable link. This enables to place communication device 60 at a different location than microcontroller 12, which may be advantageous in the case where microcontroller 12 is located in an area where it is not possible to implement a wireless communication method.

Communication device 60 comprises a microcontroller 62 (μC) connected to a wireless near-field communication unit 64 (NFC Unit), which is itself connected to a signal transmit and receive antenna 66 (NFC Antenna). As a variation, unit 64 may be integrated to microcontroller 62. According to an embodiment, communication unit 64 is capable of transmitting or receiving signals via antenna 66 according to a wireless communication protocol, for example, of NFC type.

Communication device 60 may advantageously be made in the form of a small integrated circuit chip.

Microcontroller 62 is connected to debugging port 38. Microcontroller 62 is capable of controlling debugging unit 36 to carry out data read and/or write operations from and/or into memory 24 while microcontroller 12 is in operation. Such non-intrusive accesses are possible for certain architectures of microcontrollers 12, particularly microcontrollers having a Cortex-M-type architecture such as specified by company ARM. Microcontroller 62 may be capable of implementing a test or debugging protocol of SWD or JTAG type. This may be obtained by the executing by microcontroller 62 of adapted programs stored in an internal memory of microcontroller 62. As a variation, a debugging interface unit may be provided between microcontroller 62 and debugging port 38. The debugging interface unit is then capable, based on signals transmitted by microcontroller 62, of outputting signals adapted to debugging unit 36 and, based on signals transmitted by debugging unit 36, of outputting signals adapted to microcontroller 62.

User interface device 55 comprises a microprocessor 70 (μP) connected to a wireless near-field communication unit 72 (NFC Unit), which is itself connected to a signal transmit and receive antenna 74 (NFC Antenna). Microprocessor 70 gathers within a same package the essential elements of a computer: a processor, memories, peripheral units, and input-output interfaces. According to an embodiment, communication unit 72 is capable of remotely transmitting or receiving signals via antenna 74 according to a wireless communication protocol, for example, of NFC type. Microprocessor 70 is further connected to a user interface unit 76 (User Interface Unit), which preferably comprises data input means and data display means. Interface unit 76 for example comprises a touch screen. User interface device 55 may comprise an external memory 78 (MEM) connected to microprocessor 70. Computer programs capable of being executed by microprocessor 70 may be stored in memory 78 or in a memory integrated to microprocessor 70. One of these programs is a graphic interface program. When this program is executed by microprocessor 70, it causes the display on the screen of device 55 of a graphic control interface of system 50. As an example, the graphic interface may comprise images of buttons or potentiometers, a request selection pulldown menu, a data display area, etc.

Preferably, device 55 is a portable device. According to an embodiment, user interface device 55 is a smartphone, a touch pad, or a laptop computer. This advantageously enables to use already-existing devices to form user interface device 55.

User interface device 55 is capable of remotely exchanging data with microcontroller 12 via communication device 60. Communication device 60 is capable of determining whether the user interface device 55 which desires to exchange data with microcontroller 12 is authorized to do so or not. According to an embodiment, a plurality of users, each provided with a user interface device 55, may be led to control system 10. A list of identifiers of authorized user interface devices 55 is stored in the memory of microcontroller 62, each identifier being associated with a specific user interface device 55.

Each identifier may have a corresponding profile which defines the rights attached to the identifier. As an example, a right corresponds to the authorization for user interface device 55 to transmit a specific request. An example of request corresponds to a request for a data write operation into memory 24 of microcontroller 12 which, when processor 22 executes a program using these data, causes the carrying out of a given function. Another example of request corresponds to a request for an operation of reading data from memory 24 of microcontroller 12. According to an embodiment, the profile of each identifier may correspond to a sequence of address segments of memory 24, each segment being associated with a writing and/or reading right. The rights may be different from one identifier to the other. In particular, for at least one specific identifier, the profile associated with this identifier may authorize it to modify the profile of another identifier to modify the rights attached to this identifier. According to an embodiment, the profile of each identifier is stored in the memory of microcontroller 62. In the following description, term "request" is used to designate the content of a message which may appear in different forms according to whether the message is exchanged between user interface device 55 and communication device 60, between communication unit 64 and microcontroller 62, or between microcontroller 62 and debugging unit 36.

Figure 5:
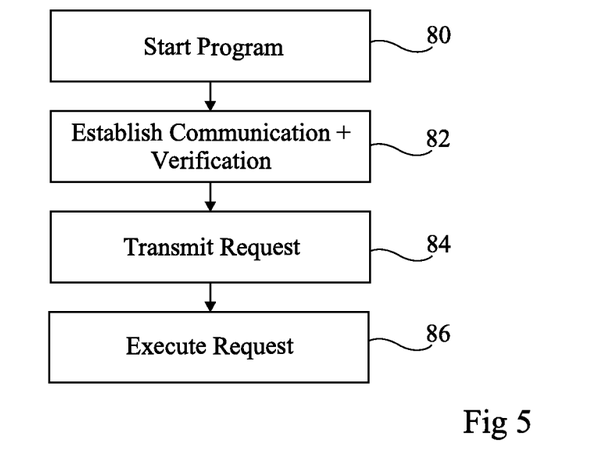
FIG. 5 shows, in the form of a block diagram, an embodiment of a method of control of the system shown in FIG. 4 by the user interface device.

FIG. 5 shows, in the form of a block diagram, an embodiment of a method of control of microcontroller 12 by user interface device 55.

At step 80, a user starts the graphic interface program on user interface device 55 and selects a request from the graphic interface. A request corresponds to the carrying out of a function by microcontroller 12. Customized requests may have been prepared by the user. The method carries on at step 82.

At step 82, the user brings user interface device 55 close to communication device 60 to initiate a data exchange. Microprocessor 70 establishes a wireless communication with microcontroller 62. The data exchange protocol between user interface device 55 and communication device 60 is preferably secure. An operation of authentication of user interface device 55 by microcontroller 62 is implemented.

As an example, a password is associated with each identifier and is stored in the memory of microcontroller 62. When user interface device 55 desires to exchange data with communication device 60, it gives its identifier and the password associated with microcontroller 62. Microcontroller 62 verifies whether the received password corresponds to the stored password associated with the identifier.

According to a variation, the starting on user interface device 55 of the graphic interface program may be automatically performed when the user brings user interface device 55 near communication device 60. Indeed, user interface device 55 may transmit its identifier to communication device 60 as soon as it is sufficiently close thereto. If microcontroller 62 determines that user interface device 55 is authorized to transmit requests thereto, microprocessor 70 may automatically start the graphic interface program. Steps 80 and 82 are then confounded.

At step 84, user interface device 55 transmits a request to communication device 60. The request for example corresponds to a request for writing data into memory 24 or a request for reading data stored in memory 24 from a location indicated in the request. Microcontroller 62 can determine whether user interface device 55 is authorized to transmit the request thereto based on the profile associated with the identifier of user interface device 55. If microcontroller 62 determines that user interface device 55 is not authorized to transmit the request thereto, the data exchange is interrupted. If microcontroller 62 determines that user interface device 55 is authorized to transmit the request thereto, the request is transmitted by microcontroller 62 to debugging unit 36. The method carries on at step 86. According to an embodiment, each request may comprise an address of the space addressable by bus 26. Microcontroller 62 may search whether there exists a segment of the profile associated with the identifier. If this segment is not present in the profile, microcontroller 62 determines that user interface device 55 is not authorized to transmit the request thereto. If this segment is present in the profile, microcontroller 62 determines whether the writing and/or reading right associated with this segment is compatible with the request transmitted by user interface device 55. If the writing and/or reading right is not compatible with the request transmitted by user interface device 55, microcontroller 62 determines that user interface device 55 is not authorized to transmit the request thereto. If the writing and/or reading right is compatible with the request transmitted by user interface device 55, microcontroller 62 determines that user interface device 55 is authorized to transmit the request thereto.

At step 86, debugging unit 36 writes or reads data into or from memory 24 according to the received request. In particular, the writing of data into memory 24 may cause the execution by processor 22 of the desired function. In the case of the reading of data from memory 24 by debugging unit 36, debugging unit 36 may provide the read data to microcontroller 62. The data are then transmitted by microcontroller 62 to wireless communication unit 64 and are then transmitted over wireless link 56 to user interface device 55. The data can then be displayed on screen 76 by the graphic interface program.

The step of authenticating user interface device 55 can only be performed once at step 82 at the time when the communication between communication device 60 and user interface device 55 is established. As a variation, the authentication step may be carried out each time user interface device 55 transmits a new request to communication device 60.

An advantage of the previously-described embodiment of the control method is that communication device 60 is connected to debugging port 38 of microcontroller 12, which is a standard port present on most microcontrollers. Thereby, the structure of microcontroller 12 is advantageously not modified. Further, the different functions carried out by user interface device 55 are obtained by a data exchange between communication device 60 and microcontroller 12 via test port 38. Test unit 36 of microcontroller 12 thus operates in the same way as during test or debugging operations even if the exchanged data are particularly used for other purposes than test or debugging operations. Thereby, the programs executed by microcontroller 12 are advantageously not modified. User interface device 55 can thus be used with no modification of microcontroller 12.

According to an embodiment, communication units 64, 72 and antennas 66, 76 are capable of implementing an NFC type wireless communication method. According to an embodiment, as shown in FIG. 4, secure wireless communication device 60 may further comprise a wireless communication unit 90 (BT Unit) connected to microcontroller 62 and to an antenna 92 (BT Antenna) and capable of implementing a wireless communication method over a larger distance than allowed by a NFC method, for example, a Bluetooth-type method. As a variation, unit 90 may be integrated to microcontroller 62. User interface device 55 further comprises a wireless communication unit 94 (BT Unit) connected to microprocessor 70 and to an antenna 96 (BT Antenna) and capable of implementing the wireless communication method with wireless communication unit 90 of communication device 60, which is illustrated in FIG. 4 by wireless link 98.

According to an embodiment, at step 82 previously described in relation with FIG. 5, the establishing of a communication between user interface device 55 and communication device 60, and in particular the verification of the rights of user interface device 55, is performed by using the NFC communication method. The data exchange between user interface device 55 and communication device 60 at the subsequent steps can then be performed by a Bluetooth-type wireless communication method.

According to an embodiment, as shown in FIG. 4, user interface device 55 further comprises a long-distance communication unit 100 (GSM Unit) connected to microprocessor 70 and to an antenna 102 (GSM Antenna) and capable of implementing a long-distance wireless communication method used in mobile telephony, for example, the GSM (Global System for Mobile Communications) communication method. User interface device 55 can then, in particular, remotely exchange data with a computer connected to the Internet, 104, over a wireless link 106.

At previously-described step 82, the authentication of user interface device 55 may further implement a data exchange over wireless link 106 between user interface device 55 and a trusted third party. Further, according to an embodiment, the identifiers, the passwords, and user profiles, or only some of these, may be stored on a distant computer. The list of the identifiers and of the passwords and the profile of the identifier of user interface device 55 can then be transmitted to microcontroller 62 via user interface device 55 by implementing a data exchange over wireless link 106 between user interface device 55 and this computer when microcontroller 62 authenticates the user interface device or determines whether a request provided by user interface device 55 should be authorized. The data exchanged between a distant computer and microcontroller 62 may be encrypted, microcontroller 62 being capable of encrypting the data provided to the distant computer and of decrypting the data transmitted by the distant computer.

Figure 6:
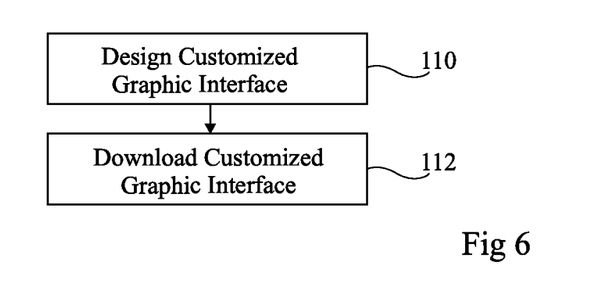
FIGS. 6 and 7 show, in the form of block diagrams, embodiments of methods of installing a graphic interface program on the user interface device.

FIG. 6 shows, in the form of a block diagram, an embodiment of a method of installing the graphic interface program on user interface device 55.

At step 110, a user who desires to install a graphic interface program on his/her user interface device 55 accesses a website where a program of design of a graphic interface adapted to electromechanical system 50 is made available. The user then defines a graphic interface by means of the graphic interface design program. Step 110 results in the generation of a customized graphic interface program.

At step 112, the customized user interface program is downloaded into user interface device 55 from the Internet, 104. The customized graphic user interface device is stored in memory 78 of user interface device 55 or in a memory integrated to microprocessor 70.

According to an embodiment, the graphic interface program may be designed in HTML (Hypertext Markup Language).

Figure 7:
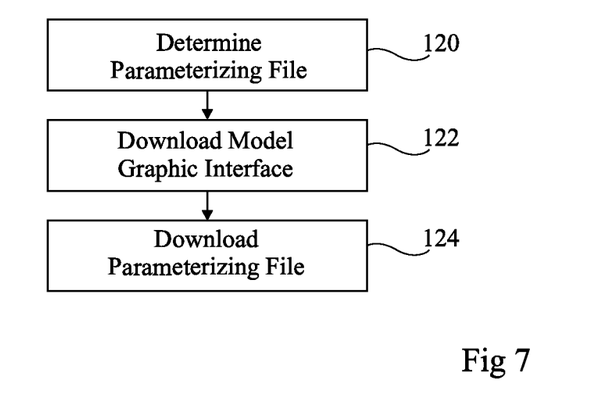

FIG. 7 shows, in the form of a block diagram, another embodiment of a method of installing the graphic interface program on user interface 55.

At step 120, like at previously-described step 110, a user who desires to install a graphic interface program on user interface device 55 accesses a website where a program of design of a graphic interface adapted to electromechanical system 50 is made available. The user then defines a customized graphic interface by means of the graphic interface design program. Step 120 results in the generation of a file for parameterizing a model graphic interface program, for example, a file at the xml (extensible markup language) format.

At step 122, the model graphic user interface program is downloaded into user interface device 55 from the Internet, 104 by long-distance communication unit 106. The model graphic user interface device is stored in memory 78 of user interface device 55 or in a memory integrated to microprocessor 70.

At step 124, the parameterizing file is downloaded into user interface device 55 from the Internet, 104. The parameterizing file is stored in memory 78 of user interface device 55 or in a memory integrated to microprocessor 70. When the user starts the graphic interface program on its user interface device 55, the graphic interface program uses the parameterizing file so that the graphic interface seen by the user corresponds to the customized graphic interface.

According to an embodiment, as shown in FIG. 4, communication device 60 further comprises a long-distance communication unit 130 (GSM Unit) connected to microcontroller 62 and to an antenna 132 (GSM Antenna) and capable of implementing a long distance wireless communication method used in mobile telephony, for example a GSM (Global System for Mobile Communications) communication method. As a variation, unit 130 may be integrated to microcontroller 62. Communication device 60 can then remotely exchange data with a computer of the Internet, 104. Such a distant communication may be used, for example, to give communication device 60 the list of identifiers, and the rights attached to each identifier and possibly the passwords associated with the identifiers. Further, according to an embodiment, the identifiers, the passwords, and user profiles, or only some of these, may be stored in a distant computer. The list of identifiers and of passwords and the profile of the identifier of user interface device 55 can then be transmitted to microcontroller 62 by a wireless data exchange between communication device 60 and this computer, when microcontroller 62 authenticates the user interface device or determines whether a request provided by user interface device 55 is authorized.

Advantageously, communication device 60 enables to add a GSM communication link to electromechanical system 50 without having to modify microcontroller 12 since the data exchanged in the GSM communication are controlled by microcontroller 62. The GSM communication link may be used by communication device 60 to transmit an alert message to an addressee via the Internet, 104. Further, an operation of maintenance or debugging of microcontroller 12 may be remotely carried out by a computer exchanging data with communication device 60 over the GSM communication link.

According to an embodiment, as shown in FIG. 4, communication device 60 further comprises an access port, for example, a serial port 140 (USB Port), and a unit for controlling access port 142 (USB Unit) connecting access port 140 to microcontroller 62. Access port 140 may correspond to a USB (Universal Serial Bus) port. As a variation, unit 142 may be integrated to microcontroller 62. A computer, not shown, may be connected to access port 140 for the data exchange with microcontroller 62. As an example, the list of identifiers and of rights attached to each identifier and possibly the passwords associated with the identifiers may be transmitted to microcontroller 62 from a computer connected to access port 140. An operation of maintenance or of debugging of microcontroller 12 may be carried out by a computer connected to access port 140.

According to an embodiment, as shown in FIG. 4, communication device 60 further comprises a memory 144 connected to microcontroller 62. Data may be stored in memory 144 by microcontroller 62. The data stored in memory 144 may be transmitted by microcontroller 62 to user interface device 55 on demand. The data stored in memory 144 may further be transmitted by microcontroller 62 to a computer connected to access port 140 or be transmitted over the Internet, 104, by GSM communication unit 130. Memory 144 may be used when the memory space available in microcontroller 62 is not sufficient. As an example, microcontroller 62 may control debugging unit 36 so that it transmits thereto, a plurality of times, a piece data stored in memory 24, to follow the time variation of this piece of data. The different values of the piece of data may be stored in memory 144. User interface device 55 may control microcontroller 62 so that it recovers all the stored values which may be given back to the user by the graphic interface program. As an example, when electromechanical system 50 is a coffee machine, the collected data may correspond to the number of coffees taken daily or to the time during which system 10 is activated. The user can then follow the variation of the collected data along time. According to an embodiment, the profiles of the identifiers may be stored in memory 144. The profile of an identifier may further comprise address segments of memory 144, each of the segments having an associated writing and/or reading right. This enables to authorize a user interface with a specific identifier to perform write and/or read operations into and/or from memory 144.

Generally, debugging port 38 may be used to carry out test or debugging operations during a setup phase of microcontroller 12. However, during the normal operation of microcontroller 12, it may be desirable for debugging port 38 to be no longer usable in order to avoid an unwanted access to the computer programs stored in microcontroller 12. However, since debugging port 38 remains physically present, certain architectures of microcontroller 12 provide the possibility of turning it into a conventional input/output port or GPIO (General Purpose Input/Output) port. When debugging port 38 is turned into a GPIO port, microcontroller 12 no longer responds to requests transmitted via this port and implementing a test or debugging protocol, for example, of SWD or JTAG type. Indeed, the signals transmitted onto the GPIO port are then processed in software fashion by processor 22, that is, by the execution of a computer program, and not in hardware fashion by debugging unit 36.

According to an embodiment, communication device 60 is capable of exchanging data with microcontroller 12 via debugging port 38 when debugging port 38 has been turned into a GPIO port. To achieve this, communication device 60 is capable of implementing a communication protocol, adapted to a GPIO port, which is similar to a protocol used to carry out test or debugging operations, but which is treated by processor 22 in software fashion. This embodiment thus requires modifying the computer programs executed by processor 22.

The reception by microcontroller 12 of a request transmitted by communication device 60 can then be treated as an interrupt by microcontroller 12, that is, processor 22 is capable of detecting that communication device 60 wants to transmit a request thereto, of interrupting the main computer program that it is executing, of executing another auxiliary computer program dedicated to the processing of the request provided by communication device 60, and once the processing of the request provided by communication device 60 is over, of resuming the execution of the main computer program. According to the requests transmitted by communication device 60, the auxiliary computer program may comprise the performing of data read and/or write operations from and/or into memory 24 by processor 22 and the transmitting of data read by processor 22 from memory 24 to communication device 60 by debugging port 38.

Conventionally, a test or debugging protocol of SWD or JTAG type implements at least two binary signals, one clock signal, called SWDCK, and one data signal, called SWDIO. According to an embodiment, the protocol implemented by communication device 60, when debugging port 38 is turned into a GPIO port, also implements a clock signal, called S3PCK, and a data signal, S3PIO. Preferably, clock signal S3PCK is transmitted to the same terminal of debugging port 38 as that having clock signal SWDCK transmitted thereto when a test or debugging protocol of SWD or JTAG type is implemented and data signal S3PIO is transmitted to the same terminal of debugging port 38 as that having data signal SWDIO transmitted thereto when a test or debugging protocol of SWD or JTAG type is implemented.

According to an embodiment, communication device 60 is capable of detecting whether debugging port 38 is capable of receiving requests according to a conventional test or debugging protocol, for example, of SWD or JTAG type, or according to a data exchange protocol adapted to a GPIO port. For the conventional test or debugging protocol, for example, the SWD protocol, clock signal SWDCK is maintained in a first state by default, for example, the low state, and the transmission of a request is initiated by setting clock signal SWDCK to the second state, for example, the high state. According to an embodiment, for the data exchange protocol adapted to a GPIO port, clock signal SWDCK is maintained in the second state by default and the transmission of a request is initiated by setting clock signal SWDCK to the first state.

According to an embodiment, a software implementation of the data exchanges between communication device 60 and microcontroller 12 enables to implement methods for increasing the protection of the exchanged data, for example, a data filtering, additional authentication measures and/or encryption methods.

According to an embodiment, communication device 60 is capable of detecting whether the pin of debugging port 38 having signal SWDCK transmitted thereto is at the first level or at the second level. In the case where the pin of debugging port 38 having signal SWDCK transmitted thereto is at the first level, communication device 60 implements a conventional test or debugging protocol for example, of SWD or JTAG type. In the case where the pin of debugging port 38 having signal SWDCK transmitted thereto is at the second level, communication device 60 implements a protocol adapted to a GPIO port.

Various embodiments with different variations have been described hereabove. It should be noted that those skilled in the art may combine various elements of these various embodiments without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A communication device (60) intended to be connected to a debugging port (38) of a first microcontroller (12), the communication device comprising a second microcontroller (62) connected to a first wireless communication unit (64) and intended to be connected to said debugging port, the first wireless communication unit being configured to receive a request over a wireless communication link transmitted by a user interface device (55), the second microcontroller being adapted to authenticate the user interface device, to determine, in the case where the user interface device is authenticated, whether the request is authorized for said authenticated user interface device, and to transmit the request to the debugging port only if the request is authorized, wherein the second microcontroller (62) comprises a first memory storing a list of identifiers and wherein the second microcontroller is configured to authenticate the user interface device (55) based on the comparison of an identifier received by the wireless communication unit (64) with the list of identifiers.

2. The communication device of claim 1, wherein the request comprises an operation of reading from or writing into a location of a second memory (24) of the first microcontroller (12), the second microcontroller (62) being configured to determine whether the request is authorized by determining whether the location belongs to a list of locations authorized for the authenticated user interface device and whether the request read or write operation is authorized for said location.

3. The communication device of claim 1, wherein the first wireless communication unit (64) is connected to a first antenna (66), the communication device (60) comprising a second wireless communication unit (90) connected to a second antenna (92) different from the first antenna.

4. The communication device of claim 3, wherein the first wireless communication unit (64) is configured to implement an NFC communication method and wherein the second wireless communication unit (90) is configured to implement a Bluetooth communication method.

5. The communication device of claim 1, comprising a third wireless communication unit (130) connected to a third antenna (132) different from the first and second antennas (66, 92).

6. The communication device of claim 5, wherein the third wireless communication unit (130) is configured to implement a GSM communication method.

7. The communication device of claim 1, wherein the second microcontroller (62) is configured to authenticate the user interface device (55) based on the comparison of a password received by the first wireless communication unit (64) with a list of passwords.

8. An electronic or electromechanical system (50) comprising:
a first microcontroller (12) comprising a processor (22), a second memory (24), a debugging unit (36), and a debugging port (38), the debugging unit and the processor being configured to read and write data from and into the second memory, the debugging unit being connected to the debugging port;

the communication device (60) of claim 1, connected to the debugging port; and
a user interface device (55) configured to transmit a request to the communication device over a wireless link.

9. The electromechanical system of claim 8, wherein the user interface device (55) is selected from the group comprising a smartphone, a touch pad, or a laptop computer.

10. The electromechanical system of claim 8, wherein the debugging port is a SWD or JTAG port.

11. A method of controlling the electronic or electromechanical system (50) of claim 8, comprising the steps of:
authentication of the user interface device (55) by the second microcontroller (62);
transmission by the user interface device (55) of a request to the communication device (60) over a wireless link;
analysis of the request by the second microcontroller (62) in the case where the user interface device is authenticated, to determine whether the request is authorized for said authenticated user interface device; and
transmission by the second microcontroller (62) of the request to the debugging unit (36) via the debugging port (38) only if the request is authorized.

12. The control method of claim 11, wherein the second microcontroller (62) comprises a first memory storing a list of identifiers and wherein the second microcontroller authenticates the user interface device (55) based on the comparison of an identifier received by the wireless communication unit (64) with the list of identifiers.

13. The control method of claim 11, further comprising the steps of:
reading or writing of data from or into the second memory (24) by the debugging unit (36) based on the request;
supply of the data to the communication device (60) by the debugging unit via the debugging port (38); and
supply of the data by the communication device (60) to the user interface device (55) over a wireless link.

14. The control method of claim 11, wherein the communication device (60) is configured to transmit requests to the debugging port (38) according to a SWD or JTAG protocol.

15. The control method of claim 11, wherein the communication device (60) is configured to transmit requests to the debugging port (38) according to a protocol adapted to a GPIO port.

16. The control method of claim 11, wherein the communication device (60) is configured to detect whether the debugging port (38) is configured to receive requests according to a SWD or JTAG protocol or has been modified to receive requests according to a protocol adapted to a GPIO port.

* * * * *